Patented June 22, 1948

2,443,867

UNITED STATES PATENT OFFICE 2,443,867

METHOD OF OBTAINING CONCENTRATES FROM WEAK SOLUTIONS

Harry A. Noyes, Watertown, Mass.

No Drawing. Original application August 26, 1940, Serial No. 354,253. Divided and this application May 26, 1945, Serial No. 596,093

13 Claims. (Cl. 99—205)

The present invention relates to the production of concentrates and precipitates from plant juices, extracts, and infusions. Its objects are to obtain such concentrates and precipitates by the use of refrigeration; to refine and clarify such substances through utilizing the consequences of "solubility products" phenomena existing at temperatures below the freezing point of water; to obtain the desired substances by adding miscible materials which lower the freezing points of solutions having low contents of solids and subsequently effecting ice separation through controlled extraction and addition of heat; and to employ the controlled formation of ice as a means of concentration and/or separation of soluble or insoluble matter present in solutions.

The present application in which the procedures for realizing the foregoing objects are described and claimed is a division of my prior application Serial No. 354,253, filed August 26, 1940 (on which Patent 2,395,498 was issued February 26, 1946), entitled Treating plant products.

Plants and the natural products of plants are the sources of drugs and other compounds having specific medicinal values and other qualities prized for various reasons by mankind. Such compounds and substances, when not existing exclusively in the juice of the plant or its fruit, are extracted in various ways by the use of water, alcohol and other solvents or liquid vehicles which are capable of extracting the substances.

Many of the aqueous solutions obtained by percolation or other procedures in which water is used as a solvent, are weak in the total quantity of solids present in solution and their freezing points are not appreciably lower than the freezing point of pure water. Many of the substances herein referred to are not soluble in water in large enough quantities to make solutions of which the freezing points are appreciably lower than that of water. Hence when heat is extracted from such solutions to the extent that the solvent is changed to the solid state, the dissolved matter is not susceptible of being advantageously separated by controlled addition of heat to the mass.

The present invention comprises treatments by which weak solutions are conditioned for concentration of specific soluble solids therein and separation of the specific soluble solids therefrom.

In one mode of treatment a secondary solution is prepared of which the freezing point is a few degrees lower than that of the solution containing the matter to be concentrated or recovered and which is miscible therein. When the solution to be concentrated is an aqueous solution, the secondary solution may be also an aqueous one prepared to have a freezing point of 30° F. or lower; that is, preferably two degrees or more below the freezing point of the solution to be concentrated. The freezing point depressant in the secondary solution may be a soluble solid or a liquid of which the freezing point is lower than that of water, which can be separated from the desired substance by suitable further treatment, or is such that its presence in admixture with the substance is desired or unobjectionable.

The secondary solution is chilled to its freezing point and/or heat is further extracted until a considerable quantity of ice crystals form in it. The solution to be concentrated is cooled to approximately its freezing point, but not enough to freeze it, and is then gradually added to the mixture of the secondary solution and ice. Heat is withdrawn from the mixture as the solution to be concentrated is added, so as to maintain conditions for increased ice separation, and the solution is kept in motion in a manner such that the energy applied in moving it does not generate enough heat to prevent the desired ice formation. Under this procedure, water in the solution to be concentrated crystallizes as ice on the ice already present and/or forms new ice without entrapping any considerable proportion of the matter dissolved in the original juice or infusion. Thereby the infusion is concentrated. When concentrated to the desired degree, it is removed from the ice.

When the desired product is one which is put out for use in preparations containing alcohol, sugar, glycerine, or other soluble or miscible substance of which the freezing point is lower than that of water, the secondary solution above described is often made up with one or more of such substances in concentration sufficient to lower its freezing point to the desired degree.

A variation of the procedure which may be used is to extract heat from the secondary solution until such capacity for absorption of heat has been developed by changes in the condition of its substances that, when added to the plant juice or extract, the latter is chilled to the extent that a prescribed portion of its water is separated out as ice and the desired ingredients are concentrated. For this procedure the secondary solution is prepared by dissolving in it a sufficient quantity of the freezing point depressant, to have a freezing point low enough to accomplish the desired effect.

Concentration of some solutions effected as before described may be carried to the point where the desired ingredients are precipitated as solids, which are collected therefrom in the solid state.

Another variation is to make the temperature of the secondary solution containing ice crystals such that the ice present tends to melt, then add a small amount of the plant juice or extract to the solution, extract heat from the resulting mixture to the degree where ice formation results, proceeding thus until enough ice has separated to cause considerable concentration of the liquid remainder of the solution, then adding more of the liquid to be concentrated, and continuing until a desired concentration has been achieved.

When the residual solution has been thus concentrated to the extent that its freezing point is appreciably lower than that of water, extraction of heat may be continued until the whole mass is virtually solid, that is, brought to the condition where the properties of a liquid cease to be evident in the frozen mass. Thereafter heat is applied to the virtually solidified mass, not at a high temperature, but at a temperature, lower than the freezing point of water, at which a concentrated solution of the substance to be recovered is liquefied. The heat is applied in such manner that it is well distributed throughout the solid mass and equally effective, or substantially so, on the mass as a whole. This liquid concentrate is then separated from the ice mass.

Some of the substances contained in extracts of the character here referred to are insoluble in highly concentrated solvents, such as alcohol, while being soluble in dilutions of the same solvents. For recovering such a substance, a dilute secondary solution of such solvent is made, chilled, and mixed with the plant extract in any of the modes precedently described. Separate formation of ice then produced results in causing increased concentration of the alcohol (or other solvent) as well as of the matter in solution, until the latter is precipitated. Or, if desired, a quantity of the concentrated solvent may be added either before or when the ice formation has proceeded to the extent above indicated. The liquid solution is then drained off through the ice particles, leaving the ice and the precipitate entrapped among the ice crystals.

In this, and other of the within described procedures where the material which it is desired to concentrate has been precipitated, the ice acts as a filter, when present in sufficient quantity and with its particles close enough together. Such of the precipitate as remains with the ice is then separated by melting the ice, holding temperatures low to prevent excessive solution of the substances, and separating the water of liquefaction from the solid precipitate. The water of liquefaction may contain some of the precipitated substances redissolved in it; and in that case it may be used again as an extracting agent in the manner described, and afterwards concentrated. Such of the precipitate as comes away from the ice with the solution can be separated by other filtering means.

It is necessary to keep the mixtures of solutions herein described at temperatures lower than those at which there would be an equilibrium between the ice phase and water. Since glycerine, sugars and some other temperature depressants tend to delay the formation of ice, their specific retarding effects in some cases must be overcome by the employment of temperatures lower than the freezing points calculated on the basis of the amounts of the substances present, and sometimes by agitation.

A common principle is present in all of the specific procedures herein described, this being the generic idea of mingling the extract or infusion, when at a temperature near its freezing point, with a secondary solution of which the freezing point is lower than that of the infusion, and maintaining the temperature during the procedure at such a low point that the solid phase of the solvent is produced without solidification of the entire quantity of solution.

In carrying out any of the foregoing procedures the addition of the solution from which the water is to be separated as ice must be so regulated that it is not "quick frozen" "en masse" before there is separation of the constituents.

I have discovered that the mechanics of the solution can be different just as soon as some other substance besides ice is coming out of solution on the further extraction of heat. If, for example, lactose is present, in solid form, and in solution, and there is ice also, I have noted a tendency for the lactose that is out of solution to go into solution with a very limited but temporary prevention of further formation of ice when water is added for separation by the temperature lowering step. Within close ranges, the heat of solution, latent heat of melting, and the production of a condition that gives a new phase of a substance all have influences that must be taken into account in connection with the extraction of heat, according as the phenomena are endothermic or exothermic.

What I claim is:

1. The method of concentrating plant juices, extracts and infusions, which comprises providing a secondary solution of which the freezing point is lower than that of the solution to be concentrated and which is miscible therewith, chilling such secondary solution to its freezing point, cooling the solution to be concentrated to a temperature near its freezing point, and mingling the two solutions while withdrawing heat therefrom, so that part of the solvent of the first solution is transformed to the solid phase.

2. The method of concentrating plant juices, extracts and infusions of which the freezing point is approximately the same as that of pure water, which comprises chilling a secondary solution, which is miscible with the solution to be concentrated and of which the freezing point is lower than that of water, until crystals form therein, cooling the solution to be concentrated to near its freezing point, and adding it to the secondary solution, with subsequent extraction of heat from the latter, at a rate such that a portion of the water content of the first solution freezes on the ice crystals of the secondary solution.

3. The method of concentrating plant juices, extracts and infusions, which comprises preparing a solution of a substance which is miscible with the solution to be concentrated and of which the freezing point is lower than that of water, chilling the secondary solution to a temperature lower than the freezing point of water, and adding said chilled solution to the first solution in quantity sufficient to cause formation and accumulation of ice therein.

4. The method of concentration set forth in claim 1, combined with the further step of separating the ice so formed from the residual liquid.

5. The method according to claim 2, combined with the step of separating the ice so formed from the residual liquid.

6. The method according to claim 3, combined with the further step of separating the mixture of solutions from the accumulation of ice.

7. The method of recovering a plant extract from a dilute aqueous solution of such extract, which comprises preparing an aqueous solution of a substance which is miscible with the plant extract solution having a freezing point substantially lower than the freezing point of water, chilling a quantity of the second named solution to a temperature substantially lower than the freezing point of water, and mixing the two solutions together in proportions such that water in the plant extract solution is converted into ice and the plant extract is precipitated.

8. The method of obtaining in concentrated form a plant extract which is soluble in a given solvent when the solvent is diluted with water but is insoluble in the concentrated solvent, which consists in preparing a dilute water solution of such solvent having a freezing point lower than the freezing point of water, mingling that solution with the aqueous plant extract solution, and withdrawing heat from the mixed solutions until a substantial proportion of the water in the mixed solutions is transformed into ice and the residual solution is concentrated to the degree of solvent strength at which the plant extract in solution is precipitated.

9. The method of obtaining in concentrated form from an aqueous solution thereof a plant extract which is soluble in alcohol and water solutions of relatively low alcohol content and insoluble in such solutions of high alcoholic strength, which comprises extracting heat from a dilute alcohol solution of such plant extract in sufficient measure to cause transformation of so much of the water content of the solution into ice that the alcohol content thereof is concentrated to the extent that at least part of the extract is precipitated, and separating the residual liquid and precipitate from the ice.

10. The method of obtaining in concentrated form from an aqueous solution thereof a plant extract which is soluble in alcohol and water solutions of relatively low alcohol content and insoluble in such solutions of high alcoholic strength, which comprises extracting heat from a dilute alcohol solution of such plant extract in sufficient measure to cause transformation of so much of the water content of the solution into ice that the alcohol content thereof is concentrated to the extent that at least part of the extract is precipitated, withdrawing the residual liquid from the ice so formed in a manner to cause deposition of precipitate on the ice, and recovering the precipitate by melting the ice and separating the water of liquefaction from the precipitate.

11. The method of obtaining in concentrated form a plant extract which is soluble in water-alcohol solutions of relatively low alcohol content and insoluble in such solutions of high alcoholic strength, which comprises withdrawing heat from a dilute alcohol solution of such plant extract until a substantial proportion of the water content thereof is transformed into ice, and then adding sufficient alcohol to the solution to precipitate the extract.

12. The method of obtaining in concentrated form a plant extract which is soluble in water-alcohol solutions of relatively low alcohol content and insoluble in such solutions of high alcoholic strength, which comprises withdrawing heat from a dilute alcohol solution of such plant extract until a substantial proportion of the water content thereof is transformed into ice, then adding sufficient alcohol to the solution to precipitate the extract, withdrawing the residual liquid from the ice in such manner that precipitate is deposited on the ice, melting the ice, and separating the water of liquefaction from the precipitate.

13. The method of obtaining in concentrated form, from a dilute aqueous solution thereof, a plant extract which is soluble in an alcohol and water solution but insoluble in concentrated alcohol, which comprises mingling the aqueous solution of the plant extract with an aqueous solution of alcohol having a freezing point lower than the freezing point of water, and extracting heat from the mixture in sufficient measure to cause transformation of so much of the water content of the mixture into ice as to concentrate the alcohol content thereof to the extent that at least part of the extract is precipitated.

HARRY A. NOYES.

REFERENCES CITED

The following references are of record in the file of this patent:

UNITED STATES PATENTS

| Number | Name | Date |
|---|---|---|
| 761,387 | Monti | May 31, 1904 |
| 1,362,870 | Johnson | Dec. 21, 1920 |
| 1,379,470 | Monti | May 24, 1921 |